United States Patent
Smart

(10) Patent No.: US 8,020,537 B2
(45) Date of Patent: Sep. 20, 2011

(54) FUEL ECONOMIZER FUEL VAPOR SYSTEM FOR INTERNAL COMBUSTION ENGINE

(75) Inventor: Christopher Smart, Tulsa, OK (US)

(73) Assignee: Advanced Mileage Technologies, LLC, Little Silver, NJ (US)

( * ) Notice: Subject to any disclaimer, the term of this patent is extended or adjusted under 35 U.S.C. 154(b) by 0 days.

(21) Appl. No.: 13/097,216

(22) Filed: Apr. 29, 2011

(65) Prior Publication Data

US 2011/0197867 A1    Aug. 18, 2011

Related U.S. Application Data

(63) Continuation-in-part of application No. 12/791,624, filed on Jun. 1, 2010, now Pat. No. 7,980,230, and a continuation of application No. 12/652,986, filed on Jan. 6, 2010, now Pat. No. 7,886,725.

(60) Provisional application No. 61/251,913, filed on Oct. 15, 2009.

(51) Int. Cl.
  *F02M 33/08* (2006.01)
  *F02G 5/00* (2006.01)
(52) U.S. Cl. ........................................ 123/557; 123/514
(58) Field of Classification Search .................. 123/514, 123/540, 541, 543, 545, 557
  See application file for complete search history.

(56) References Cited

U.S. PATENT DOCUMENTS

| | | | |
|---|---|---|---|
| 1,782,602 A | 11/1930 | Brush | |
| 2,104,974 A | 1/1938 | Dawes | |
| 2,991,777 A | 7/1961 | Foreman et al. | |
| 3,498,279 A | 3/1970 | Seeley | |
| 3,794,000 A | 2/1974 | Hodgkinson | |
| 3,913,543 A | 10/1975 | Richard | |
| 3,935,849 A | 2/1976 | Mills | |
| 3,939,813 A | 2/1976 | Harrow et al. | |
| 3,987,773 A | 10/1976 | Harrow et al. | |
| 4,003,356 A | 1/1977 | Naylor | |
| 4,015,570 A | 4/1977 | Sommerville | |
| 4,083,340 A | 4/1978 | Furr et al. | |
| 4,091,782 A * | 5/1978 | Dunnam | 123/557 |
| 4,192,266 A | 3/1980 | Duckworth | |
| 4,303,051 A | 12/1981 | Weishaar | |
| 4,323,043 A | 4/1982 | Alderson | |
| 4,325,341 A | 4/1982 | Yamanchi et al. | |

(Continued)

*Primary Examiner* — Hai Huynh
(74) *Attorney, Agent, or Firm* — Head, Johnson & Kachigian, P.C.

(57) ABSTRACT

A fuel vaporizer system for an internal combustion engine including a first closed chamber defining a first volume, the first closed chamber having a heat transfer surface; a second closed chamber at least partially surrounding the first closed chamber and defining a second volume; and a third closed chamber at least partially surrounding the second closed chamber and defining a third volume. A liquid fuel supply system including a liquid fuel supply line emits fuel into the first volume in an expanding pattern of liquid fuel spray from at least one orifice. A thermal fluid system from said engine is configured to circulate fluid, which may be engine coolant, through the second volume and transfer heat from the fluid through the first closed chamber and vaporize said liquid fuel. An exhaust system from said engine is configured to circulate exhaust through the third volume and transfer heat from the exhaust through the second closed chamber and heat said fluid. A vaporized fuel outlet is configured to direct vaporized fuel from the first closed chamber to supply fuel to at least one combustion region of the internal combustion engine via a combustion fuel supply line.

18 Claims, 4 Drawing Sheets

U.S. PATENT DOCUMENTS

| | | |
|---|---|---|
| 4,341,194 A | 7/1982 | Wolters et al. |
| 4,349,001 A | 9/1982 | Wagner |
| 4,367,717 A | 1/1983 | Ray |
| 4,395,995 A | 8/1983 | Crain |
| 4,422,429 A | 12/1983 | Reed |
| 4,442,819 A | 4/1984 | Veach |
| 4,476,840 A | 10/1984 | Budnicki et al. |
| 4,476,841 A | 10/1984 | Duckworth |
| 4,483,305 A | 11/1984 | Gilmor |
| 4,483,307 A | 11/1984 | Gilmor |
| 4,510,913 A | 4/1985 | deCelle |
| 4,528,967 A | 7/1985 | Bart |
| 4,567,857 A | 2/1986 | Houseman et al. |
| 4,594,991 A | 6/1986 | Harvey |
| 4,679,539 A | 7/1987 | Storbakken |
| 4,722,314 A | 2/1988 | Martinson |
| 4,784,092 A | 11/1988 | Pitti |
| 4,829,969 A | 5/1989 | Ray |
| 4,836,173 A | 6/1989 | Stires, Jr. |
| 4,846,137 A | 7/1989 | Ray |
| 4,883,040 A | 11/1989 | Rocky |
| 4,955,351 A | 9/1990 | Lewis et al. |
| 5,019,120 A | 5/1991 | Lewis et al. |
| 5,035,227 A | 7/1991 | Hansen |
| 5,118,451 A | 6/1992 | Lambert, Sr. et al. |
| 5,215,065 A | 6/1993 | Snyder |
| 5,257,609 A | 11/1993 | Reed et al. |
| 5,291,870 A | 3/1994 | Covey, Jr. |
| 5,327,875 A | 7/1994 | Hall |
| 5,443,053 A | 8/1995 | Johnson |
| 5,540,198 A | 7/1996 | Hurner |
| 5,746,188 A | 5/1998 | Cooke |
| 5,782,225 A | 7/1998 | Caggiano |
| 5,850,821 A | 12/1998 | Curtis |
| 6,227,151 B1 | 5/2001 | Ma |
| 6,237,575 B1 | 5/2001 | Lampert et al. |
| 6,371,090 B1 | 4/2002 | Howell |
| 6,725,846 B2 | 4/2004 | Armstrong |
| 6,758,194 B2 | 7/2004 | Shetley et al. |
| 6,769,421 B2 | 8/2004 | Newhouse et al. |
| 6,868,839 B2 | 3/2005 | Chu |
| 7,210,467 B2 * | 5/2007 | Kweon et al. ................. 123/557 |
| 7,415,975 B2 | 8/2008 | Lerner |
| 7,444,230 B2 | 10/2008 | Cheiky |
| 7,478,628 B2 | 1/2009 | Hines |
| 7,546,826 B2 | 6/2009 | Cheiky |
| 7,644,705 B2 | 1/2010 | Ozdemir |
| 7,657,363 B2 | 2/2010 | Cheiky |
| 7,886,725 B1 | 2/2011 | Smart |
| 2003/0116143 A1 | 6/2003 | Armstrong |
| 2003/0234455 A1 | 12/2003 | Mieney et al. |
| 2004/0200461 A1 | 10/2004 | Chu |
| 2005/0188963 A1 | 9/2005 | Stoddard |
| 2005/0193993 A1 | 9/2005 | Dale |
| 2005/0279334 A1 | 12/2005 | Lerner |
| 2006/0249129 A1 | 11/2006 | Ozdemir |
| 2008/0053416 A1 | 3/2008 | Hines |
| 2008/0078363 A1 | 4/2008 | Apperson |
| 2008/0257315 A1 | 10/2008 | Thomas |
| 2009/0139498 A1 * | 6/2009 | Rasmussen ................... 123/541 |
| 2010/0288245 A1 * | 11/2010 | Fertig ........................... 123/557 |

* cited by examiner

FUEL ECONOMIZER FUEL VAPOR SYSTEM FOR INTERNAL COMBUSTION ENGINE

CROSS REFERENCE

This application claims priority to U.S. Utility patent application Ser. No. 12/791,624, filed Jun. 1, 2010, which claims priority to U.S. Utility patent application Ser. No. 12/652, 986, filed Jan. 6, 2010, now U.S. Pat. No. 7,886,725, and U.S. Provisional Patent Application Ser. No. 61/251,913, filed Oct. 15, 2009, all incorporated in their entireties herein by reference.

BACKGROUND OF THE INVENTION

1. Field of the Invention

This invention relates generally to a system that transforms liquid fuel into fuel vapor in order to improve combustion in internal combustion engines.

2. Description of the Related Art

The manner in which fuel is provided to an engine significantly affects both fuel efficiency and exhaust emissions. In a piston engine with a carburetor, liquid gasoline is introduced centrally to a flow of combustion air, following which the air-fuel mixture is divided and distributed to the engine cylinders. In a piston engine with fuel injectors at the cylinders, pressurized liquid fuel is forced through nozzles of the injectors to inject sprays of liquid fuel particles. The sprays are injected into combustion air at the inlet ports of the cylinders or directly into the combustion regions. Incomplete combustion of the fuel in these and other engines detrimentally affects fuel economy and produces harmful emissions.

Over many decades, suggestions have been made to pre-vaporize fuel as a way to improve fuel efficiency and decrease emissions of internal combustion engines.

Cooke (U.S. Pat. No. 5,746,188) and Shetley (U.S. Pat. No. 6,758,194) illustrate examples of fuel vaporization systems using electric heating elements.

Notwithstanding the foregoing, there is considerable room to improve fuel efficiency and decrease emissions in internal combustion engines.

It would be desirable to provide a fuel economizer fuel vapor system that may be adapted for new vehicles and may be adapted to add to existing vehicles.

Additionally, it would be desirable to provide a fuel economizer fuel vapor system that includes a specially designed pressurized container for vaporization of liquid gasoline.

Additionally, it would be desirable to provide a closed loop fuel vapor system that restricts entry of atmospheric air therein.

SUMMARY OF THE INVENTION

A fuel vaporizer system for an internal combustion engine comprises: a first closed chamber defining a first volume, said first closed chamber having a heat transfer surface; a second closed chamber at least partially surrounding the first closed chamber and defining a second volume; and a third closed chamber at least partially surrounding the second closed chamber and defining a third volume. A liquid fuel supply system comprising a liquid fuel supply line emits fuel into the first volume in an expanding pattern of liquid fuel spray from at least one orifice. A thermal fluid system from said engine is configured to circulate fluid, which may be engine coolant, through the second volume and transfer heat from the fluid through the first closed chamber and vaporize said liquid fuel. An exhaust system from said engine is configured to circulate exhaust through the third volume and transfer heat from the exhaust through the second closed chamber and heat said fluid. A vaporized fuel outlet is configured to direct vaporized fuel from the first closed chamber to supply fuel to at least one combustion region of the internal combustion engine via a combustion fuel supply line.

The first closed chamber may be a pressure chamber having a cylindrical center, an upper spherical end, and a lower spherical end. The at least one orifice may be proximate the upper spherical end. The at least one orifice may be spaced from the heat-transfer surface. The heat transfer surface may comprise a wall, and may further comprise a member of increased surface area in thermal communication with a wall of the first closed chamber. The vaporized fuel outlet may be located proximate the upper end of the first closed chamber.

The fuel vaporizer system may further comprise a pressure relief configured to open when pressure inside the first closed chamber exceeds a predetermined threshold and to direct vaporized fuel to the liquid fuel supply system. The fuel vaporizer system may further comprise a valve in the exhaust system configured to open when the fluid is below a predetermined temperature to allow exhaust to circulate through the third closed chamber and close when the fluid is at or above a predetermined temperature to prevent exhaust from circulating through the third closed chamber. The fuel vaporizer system may further comprise a liquid fuel bypass configured to allow liquid fuel to pass from the liquid fuel supply line to the combustion fuel supply line. The liquid fuel bypass may be configured to be opened only when the first closed volume cannot supply sufficient vaporized fuel to satisfy demands of the internal combustion engine. The fuel vaporizer system may further comprise a liquid fuel return drain outlet configured to return non-vaporized fuel to the liquid fuel supply system.

Fuel may be supplied to at least one combustion region of an internal combustion engine through a method comprising: circulating exhaust through an exhaust chamber that at least partially surrounds a fluid chamber; transferring heat from the exhaust to the fluid chamber; circulating a fluid through the fluid chamber, which at least partially surrounds a vapor chamber; transferring heat from the fluid to the vapor chamber; supplying substantially liquid fuel to the vapor chamber via a liquid fuel supply line; vaporizing the substantially liquid fuel in the vapor chamber to create a super-atmospheric pressurized fuel vapor; and expelling the super-atmospheric pressurized fuel vapor from the vapor chamber to a combustion chamber fuel supply line. The method may further comprise opening a pressure relief valve and directing vaporized fuel to the liquid fuel supply line if pressure in the vapor chamber exceeds a predetermined threshold. The method may further comprise ensuring sufficient fuel to meet fuel demands of the combustion region by receiving an electrical signal at a liquid fuel bypass valve if the super-atmospheric pressurized fuel vapor from the vapor chamber is not sufficient to meet fuel demands of the combustion region; opening, at least partially, the liquid fuel bypass valve upon receiving the signal; and bypassing, at least partially, the vapor chamber by diverting liquid fuel from the liquid fuel supply line to the combustion chamber fuel supply line through the liquid fuel bypass valve. The method may further comprise measuring the fluid's temperature upon entering the fluid chamber and closing a valve if the temperature exceeds a predetermined threshold, where closing the valve stops the exhaust from circulating through the exhaust chamber.

The details of selected designs within the scope of the invention are set forth in the accompanying drawings and the description below.

DETAILED DESCRIPTION OF THE INVENTION

The embodiments discussed herein are merely illustrative of specific manners in which to make and use this invention and are not to be interpreted as limiting in scope.

While the invention has been described with a certain degree of particularity, it is to be noted that many modifications may be made in the details of the invention's construction and the arrangement of its components without departing from the spirit and scope of this disclosure. It is understood that the invention are not limited to the embodiments set forth herein for purposes of exemplification.

Figure 1:
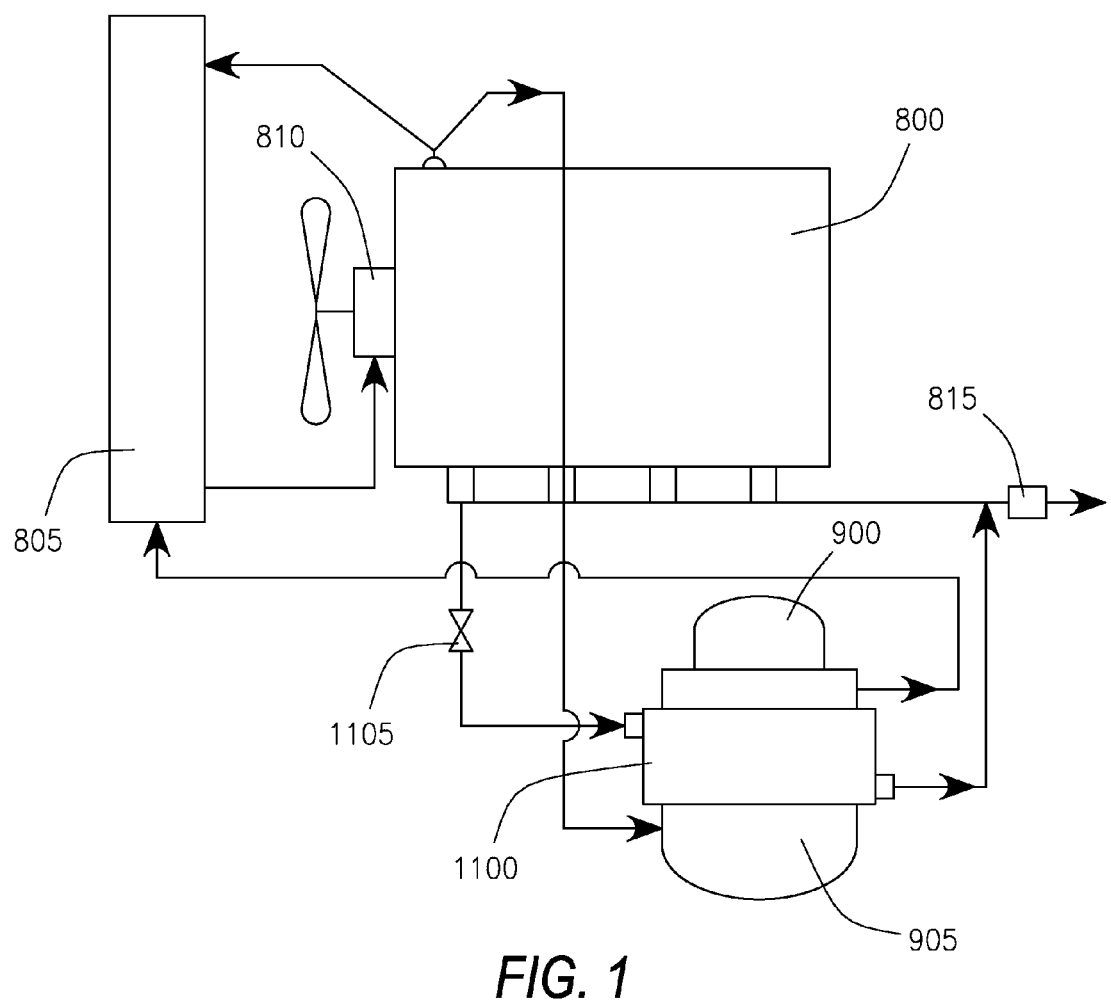
FIG. 1 is a simplified schematic illustration of a fuel vapor system of the present invention in relation to an internal combustion engine and its fluid coolant system and exhaust system.

Preferred embodiments of the present invention are illustrated in FIGS. 1 through 4 wherein engine coolant is used to heat a vapor chamber and exhaust is available to heat the engine coolant. FIG. 1 illustrates a simplified schematic of the present invention in relation to a known internal combustion engine and its fluid coolant system and exhaust system.

A vapor chamber 900 (to be described in detail below) is at least partially surrounded by a coolant chamber 905 (to be described in detail below), which in turn is at least partially surrounded by an exhaust chamber 1100. In known liquid cooled internal combustion engines, a liquid such as a coolant is delivered to and through channels running through the engine and cylinder head. The liquid may be water but is commonly a mixture of water and anti-freeze, such as ethylene glycol or propylene glycol. Fluid coolant from a vehicle thermal fluid system is circulated from an internal combustion engine 800 through a radiator 805 and then returned to the engine. The fluid coolant is also circulated from the engine 800 into the coolant chamber 905. After passing through the coolant chamber, the coolant fluid is returned to the engine 800. The coolant is circulated in a closed loop through the coolant system by a pump 810.

The coolant is thereafter delivered and returned to and through the radiator 805, so that heat is transferred from the fluid inside to the atmospheric air outside. A pump, such as a centrifugal pump 810, circulates the coolant through the system. The coolant operates in a closed system and is recirculated.

The internal combustion engine 800 also produces exhaust as a result of fuel combustion. The exhaust is discharged from the internal combustion engine 800 into the atmosphere through an exhaust system 815. The exhaust may be circulated from the engine 800 into the exhaust chamber 1100. Whether exhaust is circulated into the exhaust chamber 1100 or bypasses, the exhaust chamber 1100 may be regulated by a valve 1105. Valve 1105 may be an ERG valve.

Figure 2:
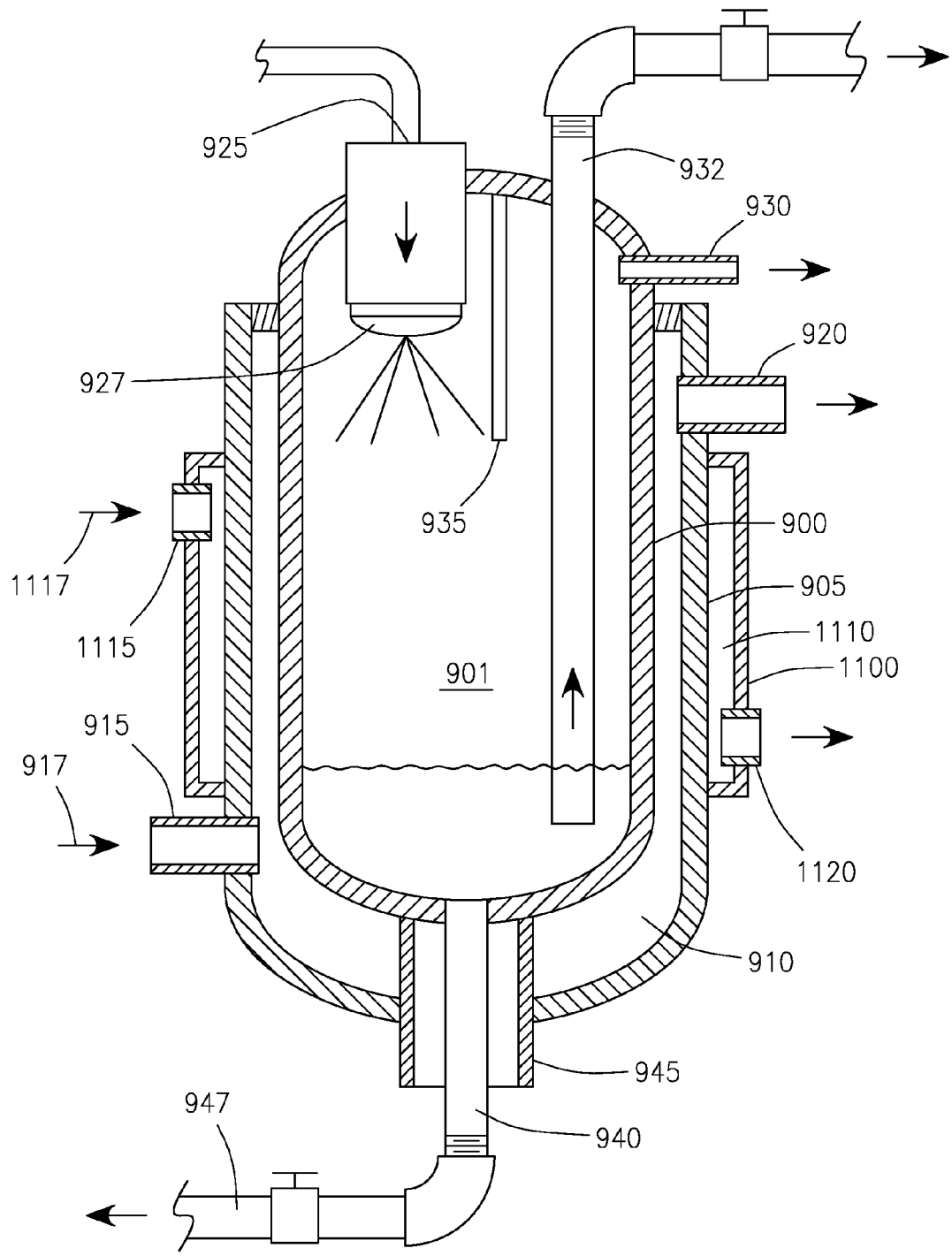
FIG. 2 is a cross-sectional view of a fuel vaporizer system for an internal combustion engine according to an exemplary embodiment of the present invention.

In the embodiment illustrated in the sectional view of FIG. 2, a vapor chamber 900 is at least partially surrounded by a coolant chamber 905 thereby creating a coolant cavity 910. The coolant chamber 905 is at least partially surrounded by the exhaust chamber 1100 thereby creating an exhaust cavity 1110.

In a preferred embodiment in FIG. 2, relatively hot liquid coolant from the engine enters through a coolant inlet 915 into the coolant cavity 910 as shown by arrow 917, flows around the exterior of the vapor chamber 900, and exits the coolant cavity 910 at a coolant exit 920. The hot coolant serves to heat the vapor chamber 900 by transferring heat from the coolant to the relatively cooler vapor chamber 900. As the fuel inside the vapor chamber is heated, the fuel will expand and be converted to its gaseous form. The vapor chamber 900 is a closed pressure vessel and preferably is designed with a cylindrical center and a pair of spherical ends for optimal strength.

When the coolant is not hot, such as upon starting the engine, the valve 1105 allows relatively hot exhaust from the engine to enter through an exhaust inlet 1015 into the exhaust cavity 1110 as shown by arrow 1117, flow around the exterior of the coolant chamber 905, and exit the exhaust cavity 1110 at an exhaust exit 1120. The hot exhaust serves to heat the coolant chamber 905 by transferring heat from the exhaust to the relatively cooler coolant chamber 905, effectively heating the coolant inside the coolant chamber 905 and allowing the coolant to, in turn, heat the vapor chamber 900 as described above. When the coolant is sufficiently hot, the valve 1105 may prevent exhaust from circulating through the exhaust chamber 1100.

In various embodiments, the exterior of the vapor chamber 900 may include fins or other surface-enhancing elements (not shown) to increase the amount of heat transfer from the coolant to the vapor chamber 900. Further, the vapor chamber 900 may be made of a material with a high thermal conductivity to promote heat transfer from the coolant through the walls of the vapor chamber 900 to the fuel in the vapor chamber 900. The coolant chamber 905 may likewise be made of a material with a high thermal conductivity to promote heat transfer from the exhaust through the walls of the coolant chamber 905 to the coolant in the coolant chamber 905. The exhaust chamber 1100 may be made of an insulative material or material with a low thermal conductivity to promote retention of heat within the exhaust chamber 1100, further promoting heat transfer to the coolant chamber 905.

In the preferred embodiment of FIG. 2, the coolant may be drawn from a standard thermal fluid cooling system of a vehicle as is well known in the art, preferably when the coolant is at or near its highest temperature such as after passing through the engine and at or near the thermostat entering the radiator. Directing the highest temperature coolant available to the vaporize the fuel provides more efficient operation.

Further to the embodiment illustrated in FIG. 2, a fuel inlet 925 for the vapor chamber 900 may include a spray nozzle 927. The force of the existing fuel pump (not shown) of the internal combustion engine moves fuel into the vapor chamber 900. Fuel entering the vapor chamber is substantially liquid in form. Application of heat will cause the liquid fuel to be converted to gaseous form. After vaporization, vaporized fuel outlet 930 is provided to allow vaporized fuel to exit the vapor chamber 900 for supplying to at least one combustion region of an internal combustion engine 800. The vaporized fuel outlet 930 is shown as being at the same end of the vapor chamber 900 as the fuel inlet 925 so that the vaporized fuel outlet is not generally aligned with the fuel inlet along the direction in which fuel is injected. This arrangement helps to promote recirculation of fuel vapor in the vapor chamber before the vapor exits the chamber through the vaporized fuel outlet 930.

A baffle 935 or baffles may be provided to discourage newly injected, substantially liquid fuel from being expelled through the vaporized fuel outlet 930. The baffle 935 may further serve as a heat sink to aid in the vaporization of the new fuel entering through the fuel inlet 925.

In at least one non-limiting embodiment, approximately 150 lbs of pressure is generated within the vapor chamber by expansion of the fuel into its gaseous form.

A drain or liquid fuel outlet 940 may be provided in the vapor chamber 900 to allow any liquid fuel which is not vaporized to exit the vaporization volume 901. Liquid fuel remaining in the vapor chamber 900 may be detrimental to the generation of vapor in the chamber 900 as the liquid fuel may absorb heat from the coolant and the liquid fuel compromises the volume available for the fuel entering the vapor chamber to be vaporized. The liquid fuel drain outlet 940 is preferably at the base of the vapor chamber 900 so that any liquid will migrate to the base by gravity. The liquid fuel outlet 940 may be controlled by a valve (not shown). The liquid fuel drain outlet 940 may be isolated from the coolant cavity 910 by a cylindrical shield 945 to prevent any exiting liquid fuel from further removing heat from the system. The liquid fuel removed from the vapor chamber 900 may be returned to the fuel tank or to the fuel line supplying the vaporizer as shown by line 947.

A secondary drain outlet 949 controlled by a valve may also be provided to remove liquid fuel.

Figure 3:
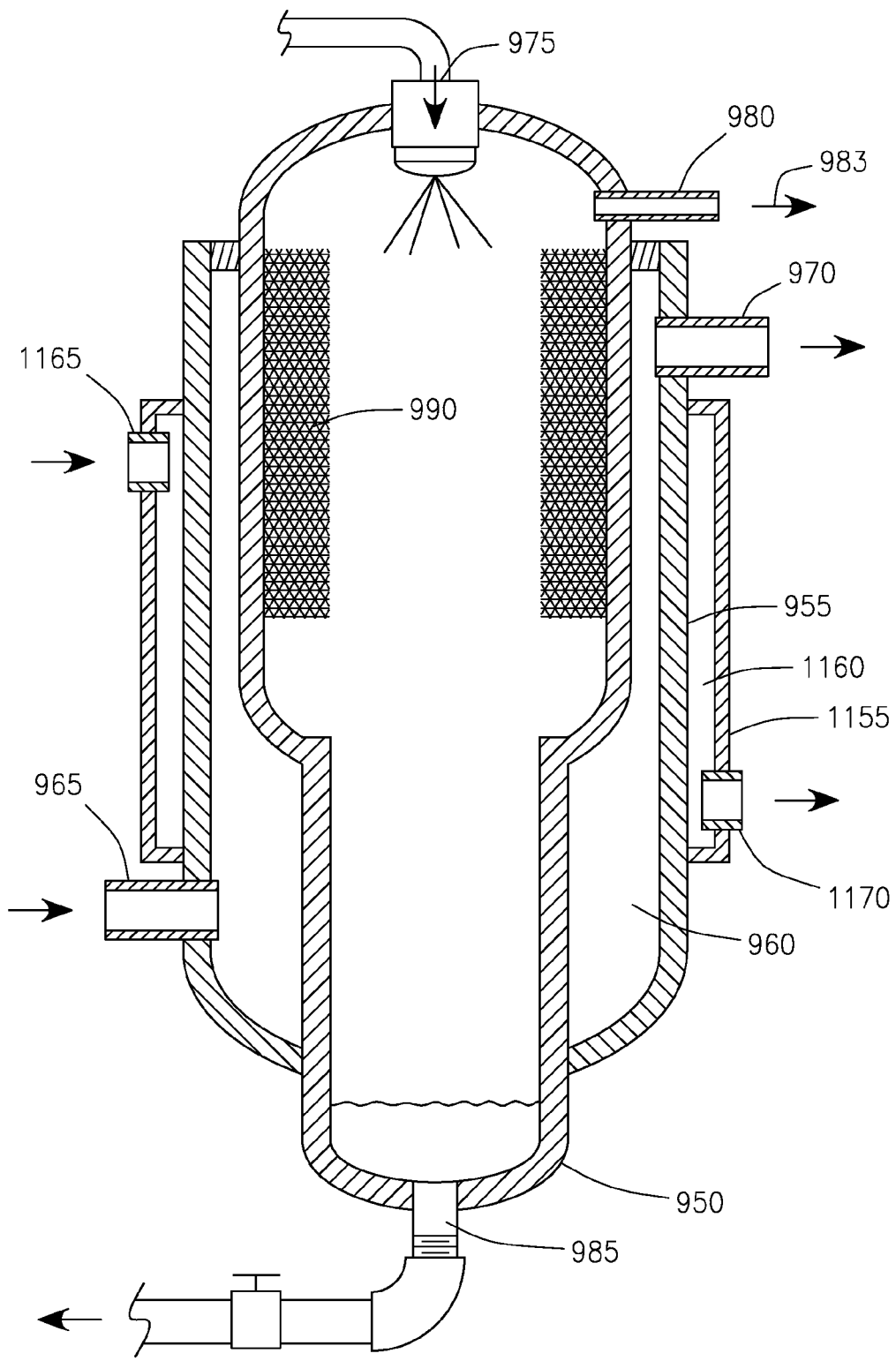
FIG. 3 is a cross-sectional view of a fuel vaporizer system for an internal combustion engine according to another exemplary embodiment of the present invention.

Another exemplary embodiment of the present invention is illustrated in the cross sectional view in FIG. 3. A vapor chamber 950 is substantially surrounded by a coolant chamber 955 forming a coolant cavity 960. The coolant cavity 960 includes both a coolant inlet 965 and a coolant outlet 970. The coolant chamber 955 is substantially surrounded by an exhaust chamber 1155 forming an exhaust cavity 1160. The exhaust cavity 1160 includes both an exhaust inlet 1165 and an exhaust outlet 1170. The illustrated embodiment further includes a fuel inlet 975, shown with a spray nozzle, a vaporized fuel outlet 980 for supply to at least one combustion region as shown by arrow 983, and a liquid fuel drain outlet 985 for return to the fuel system.

A heat-exchange element 990 promotes efficient heat transfer between the vapor chamber 950 and the incoming fuel spray. The heat-exchange element 990 may be mesh or a finned member, but generally includes a region of greater surface area than would be available without the heat exchange element 990. The increased surface area provides a heat-exchange surface available to the incoming fuel surface providing more complete and efficient vaporization of the liquid fuel. The heat-exchange element may be of any material but is preferably of a material with a high thermal conductivity to promote heat exchange between the vapor chamber 950 wall and the heat-exchange element 990.

The fuel vaporization system of the present invention may further include provisions to ensure that the combustion regions are adequately supplied with fuel under varying conditions, such as cold start and heavy load scenarios.

Figure 4:
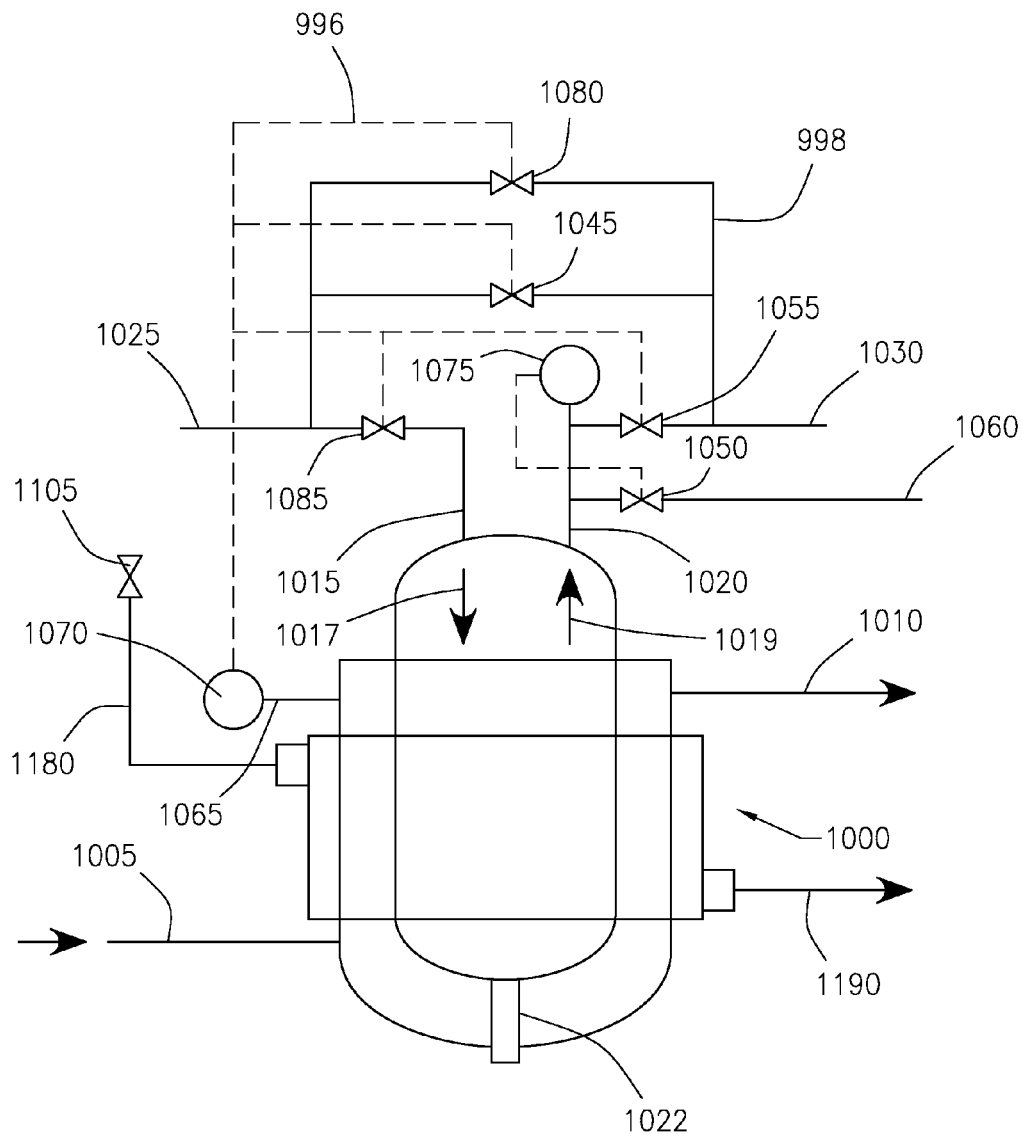
FIG. 4 is a simplified schematic illustration of a fuel system including a fuel vaporizer system according to an exemplary embodiment of the present invention.

FIG. 4 is a schematic illustration of an additional exemplary embodiment of the present invention including exempt cold-start and high load provisions. Electrical paths are represented by dashed lines 996 while fluid paths are represented by solid lines 998. The vaporizer system 1000 represented diagrammatically includes a coolant inlet 1005 and a coolant outlet 1010, as well as an exhaust inlet 1180 and an exhaust outlet 1190.

The vaporizer 1000 further includes a liquid fuel inlet 1015 as shown by arrow 1017 and a vaporized fuel outlet 1020 as shown by arrow 1019. A drain or liquid fuel outlet 1022 may be included. Liquid fuel is supplied from the fuel tank via a fuel line 1025 and a fuel line 1030 supplies fuel in liquid and/or vapor form to at least one combustion region of an engine 800. A high-load liquid fuel and cold start liquid fuel by-pass valve 1045 are illustrated.

Referring again to FIG. 4, under normal operating conditions (i.e., the engine coolant is at operating temperature, the engine under normal load conditions) the heated engine coolant enters the vaporizer system through the coolant inlet line 1005 and exits the vaporizer system through the coolant outlet line 1010. The liquid fuel is introduced from the fuel tank, along the liquid fuel line 1025, through a valve 1085, and into the vaporizer liquid fuel inlet 1015. Vaporized fuel exits the vaporizer chamber at the vaporized fuel outlet 1020, through a valve 1055, and to the at least one combustion region of the engine through the fuel line 1030.

With the engine under cold start conditions, the temperature sensor 1070 in communication with the coolant circulating into the vaporizer chamber 1000 indicates that the coolant is not at the normal operating temperature, generally between 180° F. and 220° F. An electrical signal is sent from the temperature sensor 1070 to the cold-start liquid fuel bypass valve 1045 opening the valve, allowing liquid fuel to pass from the fuel line 1025 to line 1030 in liquid form to ensure the at least one combustion region receives the necessary fuel for proper operation. Further, when the coolant temperature is below normal operating temperature, the temperature sensor 1070 sends a signal to the valve 1085 and valve 1055 to close, or to remain closed. This prevents liquid fuel from entering the vaporizer chamber which would fill the vaporizer with liquid fuel and delay or prevent the vaporizer from reaching the temperature necessary to vaporize the fuel. Alternately, when the temperature sensor 1070 indicates that the coolant is not at the normal operating temperature, the valve 1105 opens, allowing exhaust to enter the vaporizer system through the exhaust input line 1180 and exit the vaporizer system through the exhaust outlet line 1190.

While operating under normal conditions as defined above, an internal combustion engine 800 may experience demand for high power, which may occur in a vehicle engine while accelerating, passing, or going uphill or in a generator engine when the wattage demand is increased by an added electrical load. Under these conditions, an instantaneous spike in fuel demand may not be sufficiently accommodated by a vaporizer chamber sized for optimum efficiency for the application; therefore additional fuel may be required. As shown in FIG. 4, a high-load liquid fuel bypass valve 1040 is provided to allow liquid fuel to pass the vaporizer 1000 sending liquid fuel from fuel line 1025, through the high-load liquid fuel by-pass valve 1045, and through fuel line 1030 to the combustion region. In such a scenario, valve 1085 and valve 1055 may or may not be closed as the liquid fuel bypassing through valve 1045 may supplement the vaporized fuel produced by the vaporizer. The high-load liquid fuel bypass valve control signal 1080 may be provided by an electrical signal from a control module, such as from a vehicle's power control module (PCM) or a generator's engine controller, or a vacuum switch using increased intake manifold vacuum as an indication of increased power demand.

Referring again to the schematic diagram of FIG. 4, after the vaporizer system has been operating at steady-state operating temperatures for a time, the vaporizer will retain a significant amount of heat. When the engine is turned off, the coolant flow to the vaporizer may also cease, though generation of vapor within the chamber may continue for some time, particularly if any fuel puddling had previously occurred within the vapor chamber. In the illustrated example, a blowoff valve 1050 is provided to allow excess pressure built up in the vaporizer chamber to be returned safely to the fuel system while limiting the maximum pressure in the vapor chamber. A fuel-pressure regulator 1075 may provide a signal to a valve, or the valve may be configured to open upon reaching a pre-determined threshold pressure.

Whereas, the present invention has been described in relation to the drawings attached hereto, it should be understood that other and further modifications, apart from those shown or suggested herein, may be made within the spirit and scope of this invention.

What is claimed is:

1. A fuel vaporizer system for an internal combustion engine, comprising:
    a first closed chamber defining a first volume, said first closed chamber having a heat transfer surface;
    a second closed chamber at least partially surrounding the first closed chamber and defining a second volume;
    a third closed chamber at least partially surrounding the second closed chamber and defining a third volume;
    a liquid fuel supply system comprising a liquid fuel supply line to emit fuel into the first volume, where the fuel is emitted into the first volume in an expanding pattern of liquid fuel spray from at least one orifice;
    a thermal fluid system from said engine configured to circulate fluid through the second volume and transfer heat from the fluid through the first closed chamber and vaporize said liquid fuel;
    an exhaust system from said engine configured to circulate exhaust through the third volume and transfer heat from the exhaust through the second closed chamber and heat said fluid; and
    a vaporized fuel outlet configured to direct vaporized fuel from the first closed chamber to supply fuel to at least one combustion region of the internal combustion engine via a combustion fuel supply line.

2. The fuel vaporizer system of claim 1 where the first closed chamber is a pressure chamber having a cylindrical center, an upper spherical end, and a lower spherical end.

3. The fuel vaporizer system of claim 2 where the at least one orifice is proximate said upper spherical end.

4. The fuel vaporizer system of claim 1 where the at least one orifice is spaced from the heat-transfer surface.

5. The fuel vaporizer system of claim 1 further comprising a pressure relief valve configured to open when pressure inside the first closed chamber exceeds a predetermined threshold and to direct vaporized fuel to the liquid fuel supply system.

6. The fuel vaporizer system of claim 1 where the fluid is engine coolant.

7. The fuel vaporizer system of claim 1 further comprising a valve in the exhaust system configured to open when the fluid is below a predetermined temperature to allow exhaust to circulate through the third closed chamber and close when the fluid is at or above a predetermined temperature to prevent exhaust from circulating through the third closed chamber.

8. The fuel vaporizer system of claim 1 where the heat transfer surface comprises a wall.

9. The fuel vaporizer system of claim 8 where the heat transfer surface further comprises a member of increased surface area in thermal communication with the wall of the first closed chamber.

10. The fuel vaporizer system of claim 1 further comprising a liquid fuel bypass configured to allow liquid fuel to pass from the liquid fuel supply line to the combustion fuel supply line.

11. The fuel vaporizer system of claim 10 where the liquid fuel bypass is configured to be opened only when the first closed volume cannot supply sufficient vaporized fuel to satisfy demands of the internal combustion engine.

12. The fuel vaporizer system of claim 1 further comprising a liquid fuel return drain outlet configured to return non-vaporized fuel to the liquid fuel supply system.

13. The fuel vaporizer system of claim 1 where the first closed chamber comprises an upper end and an opposed lower end and where the vaporized fuel outlet is located proximate the upper end.

14. A method of supplying fuel to at least one combustion region of an internal combustion engine, comprising:
    circulating exhaust through an exhaust chamber that at least partially surrounds a fluid chamber;
    transferring heat from the exhaust to the fluid chamber;
    circulating a fluid through the fluid chamber, which at least partially surrounds a vapor chamber;
    transferring heat from the fluid to the vapor chamber;
    supplying substantially liquid fuel to the vapor chamber via a liquid fuel supply line;
    vaporizing the substantially liquid fuel in the vapor chamber to create a super-atmospheric pressurized fuel vapor; and
    expelling the super-atmospheric pressurized fuel vapor from the vapor chamber to a combustion chamber fuel supply line.

15. The method of claim 14, further comprising opening a pressure relief valve and directing vaporized fuel to the liquid fuel supply line if pressure in the vapor chamber exceeds a predetermined threshold.

16. The method of claim 14, further comprising ensuring sufficient fuel to meet fuel demands of the combustion region by:
    receiving an electrical signal at a liquid fuel bypass valve if the super-atmospheric pressurized fuel vapor from the vapor chamber is not sufficient to meet fuel demands of the combustion region;
    opening, at least partially, the liquid fuel bypass valve upon receiving the signal; and
    bypassing, at least partially, the vapor chamber by diverting liquid fuel from the liquid fuel supply line to the combustion chamber fuel supply line through the liquid fuel bypass valve.

17. The method of claim 14 where the fluid engine coolant.

18. The method of claim 14, further comprising:
    measuring the fluid's temperature upon entering the fluid chamber; and
    closing a valve if the temperature exceeds a predetermined threshold, where closing the valve stops the exhaust from circulating through the exhaust chamber.

* * * * *